US012427537B2

(12) United States Patent
Hong et al.

(10) Patent No.: US 12,427,537 B2
(45) Date of Patent: Sep. 30, 2025

(54) HYBRID SPRAY PUMP

(71) Applicant: PROTEC CO., LTD., Gyeonggi-do (KR)

(72) Inventors: Seung Min Hong, Seoul (KR); Eui Keun Choi, Seoul (KR); Soo Bin Oh, Gyeonggi-do (KR); Keon Hee Kim, Incheon (KR)

(73) Assignee: PROTEC CO., LTD., Gyeonggi-do (KR)

(*) Notice: Subject to any disclaimer, the term of this patent is extended or adjusted under 35 U.S.C. 154(b) by 381 days.

(21) Appl. No.: 17/949,242

(22) Filed: Sep. 21, 2022

(65) Prior Publication Data

US 2023/0201858 A1 Jun. 29, 2023

(30) Foreign Application Priority Data

Dec. 29, 2021 (KR) ........................ 10-2021-0191186

(51) Int. Cl.
*B05B 17/06* (2006.01)
*B05B 7/24* (2006.01)
*B05B 7/26* (2006.01)

(52) U.S. Cl.
CPC ........ *B05B 17/0615* (2013.01); *B05B 7/2497* (2013.01); *B05B 7/262* (2013.01)

(58) Field of Classification Search
CPC ... B05B 17/0615; B05B 7/2497; B05B 7/262; B05B 7/0012; B05B 7/04; B05B 17/0607; B05B 1/005; A61L 2209/132
See application file for complete search history.

(56) References Cited

U.S. PATENT DOCUMENTS

| | | | | |
|---|---|---|---|---|
| 5,733,597 | A | 3/1998 | Schmitkons et al. | |
| 9,144,818 | B2 | 9/2015 | Doyle et al. | |
| 9,429,368 | B2 | 8/2016 | Hong et al. | |
| 9,443,188 | B2 | 9/2016 | Hong et al. | |
| 9,636,699 | B2 | 5/2017 | Doyle et al. | |
| 10,328,449 | B2 | 6/2019 | Hong et al. | |
| 2002/0103657 | A1* | 8/2002 | Sun | B05B 17/0615 239/102.1 |
| 2012/0186557 | A1* | 7/2012 | Jenkins | B05B 17/0615 123/434 |
| 2013/0026197 | A1 | 1/2013 | Felix et al. | |
| 2014/0263688 | A1 | 9/2014 | Doyle et al. | |
| 2015/0300748 | A1 | 10/2015 | Hong et al. | |
| 2015/0302292 | A1 | 10/2015 | Hong et al. | |
| 2015/0367376 | A1 | 12/2015 | Doyle et al. | |

FOREIGN PATENT DOCUMENTS

| | | |
|---|---|---|
| JP | 2004154739 | 6/2004 |
| JP | 2007035662 | 2/2007 |
| JP | 2018059203 | 4/2018 |
| KR | 1020120140321 | 12/2012 |

(Continued)

*Primary Examiner* — Christopher R Dandridge
(74) *Attorney, Agent, or Firm* — JCIPRNET

(57) ABSTRACT

Provided is a hybrid spray pump which sprays and applies a viscous liquid in a fine particle state to a material. The hybrid spray pump sprays effectively fine particles of the viscous liquid according to various characteristics of the viscous liquid ranging from low to high viscosity, and improves the quality of a particle application process by mixing fine particles and aerosol particles by spraying.

10 Claims, 2 Drawing Sheets

(56) References Cited

FOREIGN PATENT DOCUMENTS

| | | | |
|---|---|---|---|
| KR | 1020130020104 | 2/2013 | |
| KR | 101301107 | 8/2013 | |
| KR | 1020170021046 | 2/2017 | |
| KR | 20170113190 | 10/2017 | |
| KR | 1020170113726 | 10/2017 | |
| WO | WO-2017164565 A1 * | 9/2017 | ............... B05B 1/00 |

* cited by examiner

HYBRID SPRAY PUMP

CROSS-REFERENCE TO RELATED APPLICATION

This application is based on and claims priority under 35 U.S.C. § 119 to Korean Patent Application No. 10-2021-0191186, filed on Dec. 29, 2021, in the Korean Intellectual Property Office, the disclosure of which is incorporated by reference herein in its entirety.

BACKGROUND

1. Field

One or more embodiments of the present disclosure relate to a hybrid spray pump, and more particularly, to a hybrid spray pump capable of spraying and applying a viscous liquid to materials in a fine particle state.

2. Description of the Related Art

Due to the 4th industry and needs for thinner and lighter weight of flexible printed circuit board (FPCB) components, printed circuit board (PCB) is rapidly developing toward miniaturization, weight reduction, and high functionality. New technology, design technology, miniaturization, high integration, and reliable high-density mounting technology are required for PCB. Electronic printing may significantly reduce production cost and investment cost by replacing the existing production method that repeats exposure and etching with a direct printing method, may reduce general production and number of processes through electronic printing technology, and may reduce development time and development costs.

In particular, the printing method in the field of electronic printing may produce a flexible/hard PCB and FPCB by printing a desired pattern and forming a line pattern through development, corrosion, and peeling at the same time.

As electronics are manufactured in thin and small forms, the demand for the flexible/hard PCB and FPCB manufactured in the field of electronic printing is increasing rapidly. In general, in the PCB process, there is a problem in filling adhesive between copper patterns due to the application of thin film cover-lay, and unfilling occurs because the coverlay adhesive layer is lower than the thickness of the copper pattern, in particular, problems such as short and migration occur in FPCB.

Etching and resist peeling of flexible/hard PCB and FPCB manufactured in the electronic printing field are a process of forming a circuit by removing a copper foil of non-circuit part on a surface of an original plate for an inner layer on which circuit printing has been completed by a photo printing method and a screen printing method with a strong corrosive chemical, and then peeling a dry film for corrosion preventing of a circuit part. However, since FPCB has a structure in which copper is attached to a film, there is a variation in shrinkage for each panel, and when 100 pieces of products are manufactured with one master film (hereinafter referred to as M/F), a phenomenon of uniformity appears according to the shrinkage of M/F. Accordingly, there may be problems such as deflection between layers during lamination. If thick dry film is applied, copper foil undercut occurs and there is a limit to realizing fine line width.

If the viscous liquid may be applied with a fine line width and an accurate capacity at a correct location by using a pump that applies the viscous liquid, a productivity of a shielding film forming process may be improved. In addition, as compared to the existing process, the undercut of the copper foil circuit is prevented and the squareness is realized, so that a skin effect is reduced at high frequencies and characteristics may be improved.

As such, an electronic ink printing method used to form patterns and electromagnetic wave shielding films of semiconductor packages in various technical fields including semiconductors, that is, the method of spraying viscous liquid, is widely used.

In fields such as electronic printing, technology capable of accurately and precisely applying with a fine line width while spraying a viscous liquid is required. In addition, a technology capable of applying a viscous liquid having various properties and viscosities depending on the application with high resolution is required as needed.

SUMMARY

One or more embodiments of the present disclosure provide a hybrid spray pump capable of effectively and accurately spraying viscous liquids with various viscosities as needed to generate fine particles and apply them accurately and precisely.

Additional aspects will be set forth in part in the description which follows and, in part, will be apparent from the description, or may be learned by practice of the presented embodiments of the disclosure.

According to one or more embodiments of the present disclosure, a hybrid spray pump includes a chamber in which a viscous liquid is stored, a vibrator installed in the chamber to generate an aerosol by transmitting vibration to the viscous liquid inside the chamber to atomize the viscous liquid, a sprayer installed inside the chamber to mix the viscous liquid inside the chamber and a pressurized gas and spray the viscous liquid in a fine particle state, a mixing pipe connected to the chamber to transfer, to an outside, the fine particles of the viscous liquid in the aerosol state and the viscous liquid in the sprayed state inside the chamber; and a nozzle which is connected to the mixing pipe and through which the fine particles of the viscous liquid are sprayed.

According to one or more embodiments of the present disclosure, a hybrid spray pump includes an aerosol chamber in which a viscous liquid is stored, a vibrator installed in the aerosol chamber to generate an aerosol by transmitting vibration to the viscous liquid inside the aerosol chamber to atomize the viscous liquid, a spray chamber in which a viscous liquid is stored, a sprayer installed inside the spray chamber to mix the viscous liquid inside the spray chamber and a compressed gas and spray the viscous liquid in a fine particle state, a mixing pipe connected to each of the aerosol chamber and the spray chamber to mix and transfer, to an outside, the viscous liquid in the aerosol state inside the aerosol chamber and the viscous liquid in the sprayed state inside the spray chamber; and a nozzle which is connected to the mixing pipe and through which the fine particles of the viscous liquid are sprayed.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
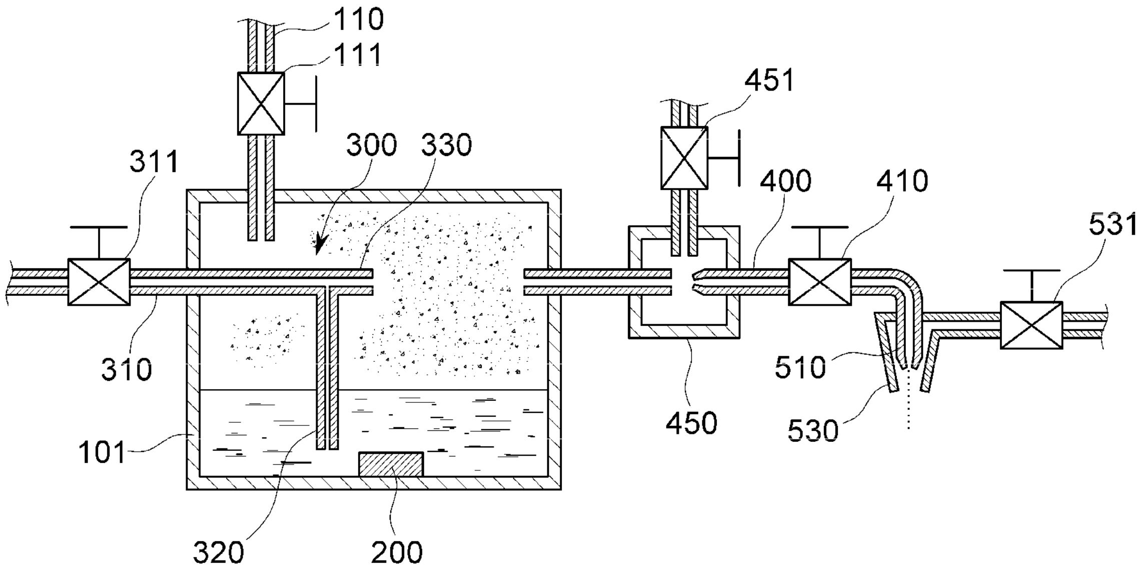
FIG. 1 is a schematic diagram of a hybrid spray pump according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, with reference to the accompanying drawings, a hybrid spray pump according to an embodiment of the present disclosure will be described.

FIG. 1 is a schematic diagram of a hybrid spray pump according to an embodiment of the present disclosure.

Referring to FIG. 1, a hybrid spray pump according to this embodiment includes a chamber 101, a vibrator 200, a sprayer 300, a mixing pipe 400 and a nozzle 510.

A viscous liquid is stored in the chamber 101. The chamber 101 is formed in a form of a container capable of storing the viscous liquid and is formed in a closed structure.

The vibrator 200 is installed in the chamber 101 and transmits vibration to the viscous liquid inside the chamber 101. In this embodiment, the vibrator 200 uses an ultrasonic vibrator. The vibrator 200 transmits vibration to the viscous liquid to atomize the viscous liquid and convert it to an aerosol state. By using such the vibrator 200, even a highly viscous liquid may be easily converted into a fine particle state. By using such a fine particle aerosol, it is possible to form a fine pattern with a precise line width on a material. As a result, the vibrator 200 and the chamber 101 perform a function of an atomizer that generates aerosol.

The sprayer 300 is installed inside the chamber 101 along with the vibrator 200. The sprayer 300 has the same structure as a general sprayer. That is, the sprayer 300 is configured to spray the viscous liquid into the fine particle state by mixing a compressed gas supplied from an outside of the chamber 101 and the viscous liquid inside the chamber 101.

In this embodiment, the sprayer 300 includes a spray gas supply pipe 310, a liquid supply pipe 320 and a spray pipe 330. The spray gas supply pipe 310 is a pipe through which compressed gas is supplied. The spray gas supply pipe 310 is connected to the outside of the chamber 101 and supplies the compressed gas to the sprayer 300 through a configuration such as a regulator. One side of the liquid supply pipe 320 is arranged to be submerged in the viscous liquid, and the other side is connected to the spray gas supply pipe 310. The viscous liquid inside the chamber 101 is delivered to the spray gas supply pipe 310 through the liquid supply pipe 320, and is sprayed by the compressed gas of the spray gas supply pipe 310. The sprayed viscous liquid in the fine particle state is sprayed into the chamber 101 through the spray pipe 330. Therefore, the spray pipe 330 is connected to an outlet side of the spray gas supply pipe 310.

A spray gas valve 311 is installed in the spray gas supply pipe 310. The spray gas valve 311 controls a flow rate of the compressed gas supplied to the spray gas supply pipe 310.

The hybrid spray pump of the present disclosure mixes the aerosol particles generated by the vibrator 200 and the spray particles generated by the sprayer 300 and applies them through the nozzle 510 as described above.

A chamber gas supply pipe 110 is connected to the chamber 101. The chamber gas supply pipe 110 supplies gas into the chamber 101. The viscous liquid fine particles inside the chamber 101 are pushed by the gas flowing in through the chamber gas supply pipe 110 and discharged into the mixing pipe 400. A chamber gas valve 111 controlling a flow rate is installed in the chamber gas supply pipe 110.

The mixing pipe 400 is connected to the chamber 101 to deliver the fine particles of the viscous liquid in the aerosol state and the viscous liquid in the sprayed state inside the chamber 101 to the outside. A mixing valve 410 controlling a flow rate inside the mixing pipe 400 is installed in the mixing pipe 400.

The nozzle 510 is installed at an end of the mixing pipe 400. The fine particles of the viscous liquid delivered through the mixing pipe 400 are sprayed through the nozzle 510. As described above, the fine particles of the viscous liquid sprayed through the nozzle 510 are applied to the material for a purpose of forming an electromagnetic interference (EMI) shield of electronic components and the like.

In the case of the hybrid spray pump according to this embodiment, a sheath nozzle 530 is additionally provided. The sheath nozzle 530 is formed to surround a portion of an outer periphery of the nozzle 510. The sheath nozzle 530 is installed in the nozzle 510 to spray a compressed gas into an outer periphery of the fine particles of the viscous liquid sprayed from the nozzle 510. The compressed gas injected through the sheath nozzle 530 wraps around the outer periphery of the viscous liquid sprayed through the nozzle 510, helping the viscous liquid to be focused without spreading and to be applied with a high resolution of the fine line width. A sheath valve 531 is installed in the sheath nozzle 530. The sheath valve 531 controls a flow rate of the compressed gas to be discharged to the sheath nozzle 530.

A virtual impactor (VI) 450 is installed in the mixing pipe 400. The virtual impactor 450 increases a density of the fine particles flowing into the mixing pipe 400. The virtual impactor separates and discharges fine particles that are too small, in some cases, controls the flow rate of the mixing pipe 400, and controls a concentration of the fine particles flowing into the mixing pipe 400.

A control unit controls operations of the vibrator 200, the spray gas valve 311, the chamber gas valve 111, the mixing valve 410 and the sheath valve 531. The control unit also controls an operation of the virtual impactor 450.

The control unit controls the operation of the valves and the vibrator 200 as described above to control spray characteristics such as the density and flow rate of the viscous liquid fine particles sprayed through the nozzle 510. In addition, the control unit controls the operation of the vibrator 200 and the spray gas valve 311 to control a ratio of the aerosol generated by the vibrator 200 and the spray particles generated by the sprayer 300 among the fine particles of the viscous liquid flowing into the mixing pipe 400. In some cases, the control unit may cause the hybrid spray pump of this embodiment to operate by operating only one of the vibrator 200 and the sprayer 300.

Hereinafter, the operation of the hybrid spray pump according to the present embodiment configured as described above will be described.

The control unit operates the vibrator 200 of the chamber 101 to atomize the viscous liquid inside the chamber 101. When the vibrator 200 transmits ultrasonic vibration to the viscous liquid, the viscous liquid changes to the aerosol state with very small particle size. Even when the viscosity of the viscous liquid is high, the vibrator 200 may effectively atomize the viscous liquid. This atomized viscous liquid is filled in an upper side of the chamber 101.

Separately, chamber 101 opens the spray gas supply pipe 310 so that the compressed gas is supplied to the spray gas supply pipe 310 of the sprayer 300. The viscous liquid is sucked up through the liquid supply pipe 320 of the sprayer 300 by the gas supplied to the spray gas supply pipe 310 and meets the compressed gas. As such, the viscous liquid delivered to the sprayer 300 through the liquid supply pipe 320 is sprayed into the fine particle state by the compressed gas and delivered to the spray pipe 330. As a result, the fine particles of the viscous liquid sprayed from the sprayer 300 are supplied to the chamber 101. The control unit controls the amount of fine particles of the viscous liquid sprayed from the sprayer 300 by manipulating the spray gas valve 311 installed in the spray gas supply pipe 310.

The viscous liquid in the aerosol state and the fine particles of the sprayed viscous liquid are mixed and stored in the chamber 101 by the vibrator 200 and the sprayer 300 as described above.

As described above, the chamber gas supply pipe 110 is connected to the chamber 101, so that the gas is supplied into the chamber 101. The control unit controls the amount of gas supplied into the chamber 101 by controlling the chamber gas valve 111 that controls the flow rate of the chamber gas supply pipe 110. The aerosol and fine particles inside the chamber 101 are transferred to the mixing pipe 400 by a pressure of the gas flowing into the chamber 101.

The fine particles of the viscous liquid delivered to the mixing pipe 400 are sprayed through the nozzle 510 and applied to the material. At this time, the control unit may control the mixing valve 410 installed in the mixing pipe 400 to adjust the spray amount of the viscous liquid fine particles injected through the nozzle 510. The line width of the pattern applied to the material may be adjusted according to the amount of fine particles of the viscous liquid sprayed through the nozzle 510.

The compressed gas may be sprayed around the nozzle 510 through the sheath nozzle 530 so that the viscous liquid fine particles sprayed through the nozzle 510 are more concentrated to the center without spreading to the surroundings. The control unit may operate the sheath valve 531 to control the flow rate of the compressed gas (sheath air) sprayed through the sheath nozzle 530 to control the spray characteristics of the viscous liquid sprayed through the nozzle 510.

Meanwhile, the virtual impactor 450 is installed in the mixing pipe 400 as illustrated in FIG. 1. The virtual impactor 450 is not only used to control the flow rate of the mixing pipe 400, but also mainly used to improve the properties of fine particles flowing into the mixing pipe 400. Fine particles of which the size is relatively large to have sufficient moment, are delivered to the nozzle 510 through the virtual impactor 450, and fine particles having two small sizes are not delivered to the nozzle 510 but are discharged through a VI discharge pipe connected to the virtual impactor 450. The control unit may control an amount of small fine particles discharged from the virtual impactor 450 by manipulating a VI valve 451 installed in the VI discharge pipe.

Since the hybrid spray pump of the present disclosure uses a combination of vibrator 200 and sprayer 300 to generate the fine particles of the viscous liquid, the characteristics of fine particles generated from the vibrator 200 and the sprayer 300 may be controlled depending on the use or purpose. Since the fine particles generated by the vibrator 200 are relatively small and the fine particles generated by the sprayer 300 are relatively large, various spray properties may be achieved by adjusting a mixing ratio of the two types of fine particles. In addition, since the vibrator 200 may effectively atomize highly viscous liquids and the sprayer 300 may effectively atomize low viscous liquids, the present disclosure may achieve high-quality application properties according to the characteristics of viscous liquids by using the combination of vibrator 200 and sprayer 300.

In addition, the present disclosure may achieve liquid application characteristics that go beyond simply combining the vibrator 200 and the sprayer 300. In the process of mixing and storing the fine particles generated by the vibrator 200 and the fine particles generated by the sprayer 300 inside chamber 101, the fine particles of different sizes collide with each other and split, and fine particles grow by attaching very small fine particles to relatively large fine particles. As such fine particles of different sizes interact to create new fine particle properties beyond simple mixing, the present disclosure may create a new fine particle spraying effect that conventional atomizers may not exhibit by adjusting the mixing ratio or size ratio of these two types of fine particles.

Although a preferred example has been described above for present disclosure, the scope of present disclosure is not limited to the form described and illustrated above.

For example, the hybrid spray pump of the above-described embodiment includes the spray gas valve 311, the chamber gas valve 111, the mixing valve 410, the VI valve 451, the sheath valve 531, etc., but a hybrid spray pump having a structure that does not include some of these or further includes other valves may be implemented. In addition, in the case of the valve, not only a type of valve for controlling a flow path but also various other types of valves, such as a valve capable of constantly maintaining a flow rate at a preset flow rate by sensing the flow rate in real time, may be used.

In addition, although the hybrid spray pump having the structure including the virtual impactor 450 has been described above as an example, it is also possible to configure a hybrid spray pump having a structure that does not include the virtual impactor 450.

In addition, it is possible to implement a hybrid spray pump having a structure that does not include the sheath nozzle 530, and it is also possible to implement a hybrid spray pump using a sheath nozzle 530 of a different type than illustrated in the drawings.

In addition, the virtual impactor 450 used in the present disclosure may also be used in various types of virtual impactor other than the above-described type.

Figure 2:
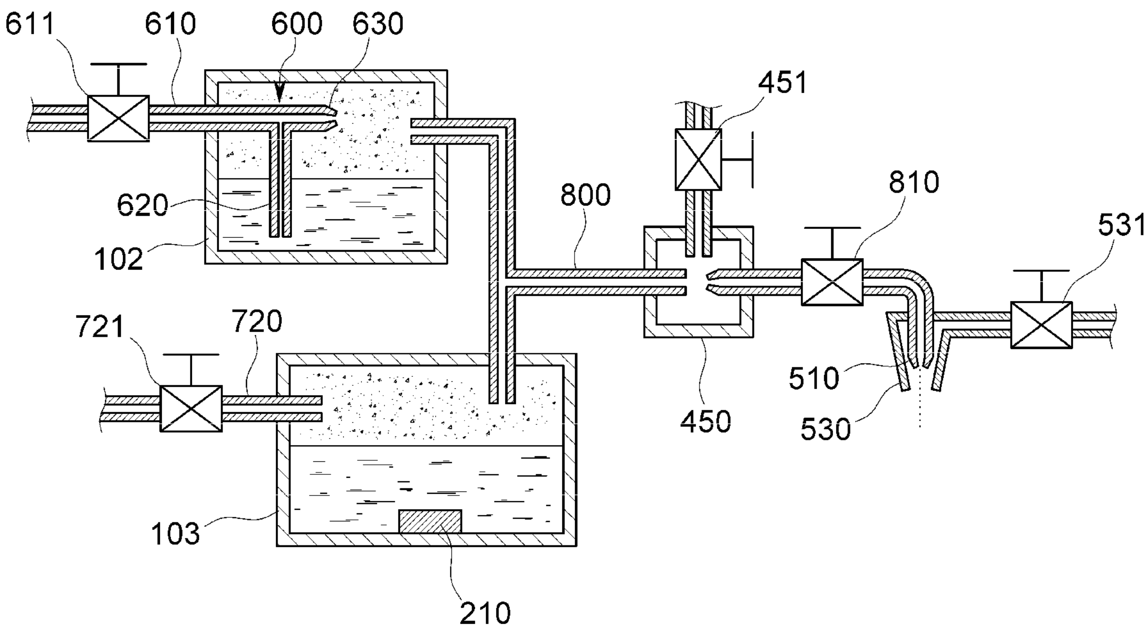
FIG. 2 is a schematic diagram of a hybrid spray pump according to another embodiment of the present disclosure.

Next, a hybrid spray pump according to another embodiment of the present disclosure will be described with reference to FIG. 2.

In the case of a hybrid spray pump of this embodiment, unlike the hybrid spray pump described with reference to FIG. 1 above, each of a sprayer 600 and a vibrator 210 generates fine particles in separate chambers 102 and 103, without sharing a chamber 101, the generated fine particles are mixed with each other in a mixing pipe 800 and delivered to a nozzle 510.

The vibrator 210 is installed in an aerosol chamber 103. An aerosol generated by the vibrator 210 is stored in the aerosol chamber 103. The aerosol of the aerosol chamber 103 is discharged to the mixing pipe 800 by a gas flowing in through a gas chamber supply pipe 720 connected to the aerosol chamber 103. A flow rate of the gas chamber supply pipe 720 is controlled by a chamber gas valve 721.

A sprayer 600 is installed in a spray chamber 102. Like the sprayer 300 of the embodiment with reference to FIG. 1, the sprayer 600 includes a spray gas supply pipe 610, a liquid supply pipe 620 and a spray pipe 630. A flow rate of the spray gas supply pipe 610 is controlled by a spray gas valve 611.

As such, the fine particles of the viscous liquid stored in each of the aerosol chamber 103 and the spray chamber 102 are mixed with each other in the process of passing through the mixing pipe 800. In some cases, an additional chamber may be provided in the mixing pipe 800 to additionally provide a space in which two types of fine particles may be mixed with each other.

A configuration of a virtual impactor 450, a mixing valve 810, the nozzle 510, a sheath nozzle 530, and the like, which is a configuration after the mixing pipe 800, is the same as the hybrid spray pump of the embodiment with reference to FIG. 1.

In the hybrid spray pump of this embodiment, since two types of fine particles are mixed with each other in the process of passing through the mixing pipe 800, a dynamic mixing effect of the two types of fine particles may further increase a mutual collision effect. A flow rate of the mixing pipe 800 is controlled by a mixing valve 810.

The hybrid spray pump of this embodiment is also possible to omit or additionally provide various valve configurations, and it is possible to change the design by modifying the virtual impactor 450 or the sheath nozzle 530 into a different structure or by configuring it to be additionally provided. The hybrid spray pump of the present disclosure may effectively spray fine particles of a viscous liquid according to various characteristics of a viscous liquid ranging from low viscosity to high viscosity. The hybrid spray pump of the present disclosure may improve a quality of a particle application process by mixing fine particles and aerosol particles by spraying.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A hybrid spray pump comprising: a chamber in which a viscous liquid is stored;

a vibrator installed in the chamber generating an aerosol by transmitting vibration to the viscous liquid inside the chamber atomizing the viscous liquid;

a sprayer installed inside the chamber to mix the viscous liquid inside the chamber and a compressed gas and spray the viscous liquid in a sprayed state;

a mixing pipe connected to the chamber to transfer, to an outside, particles of the viscous liquid in the aerosol state and the viscous liquid in the sprayed state inside the chamber, wherein the particles of the viscous liquid in the aerosol state and the viscous liquid in the sprayed state are mixed in the mixing pipe; and a nozzle which is connected to the mixing pipe and through which the particles of the viscous liquid are sprayed, wherein the particles of the viscous liquid in the aerosol state are smaller than the particles of the viscous liquid in the sprayed state.

2. The hybrid spray pump of claim 1, wherein the sprayer comprises a spray gas supply pipe to which the compressed gas is supplied, a liquid supply pipe to be submerged in the viscous liquid to transmit the viscous liquid to the spray gas supply pipe, and a spray pipe through which the viscous liquid in the sprayed state formed when the compressed gas supplied through the spray gas supply pipe meets the liquid supply pipe is sprayed into the chamber.

3. The hybrid spray pump of claim 2, further comprising a sheath nozzle installed in the nozzle to wrap around an outer periphery of the nozzle and spray a compressed gas into an outer periphery of the particles of the viscous liquid sprayed from the nozzle.

4. The hybrid spray pump of claim 2, further comprising a spray gas valve installed in the spray gas supply pipe to adjust a flow rate a mixing valve installed in the mixing pipe to adjust a flow rate, and a control unit for controlling an operation of each of the vibrator, the spray gas valve, and the mixing valve.

5. The hybrid spray pump of claim 4, further comprising a chamber gas supply pipe connected to the chamber and supplying a gas into the chamber, and a chamber gas valve installed in the chamber gas supply pipe to adjust a flow rate, wherein the control unit controls an operation of the chamber gas valve.

6. The hybrid spray pump of claim 5, further comprising a virtual impactor installed in the mixing pipe.

7. The hybrid spray pump of claim 3, further comprising a spray gas valve installed in the spray gas supply pipe to adjust a flow rate, a mixing valve installed in the mixing pipe to adjust a flow rate, a sheath valve installed in the sheath nozzle to adjust a flow rate of the compressed gas flowing via the sheath nozzle, and a control unit for controlling an operation of each of the vibrator, the spray gas valve, the mixing valve, and the sheath valve.

8. A hybrid spray pump comprising:

an aerosol chamber in which a viscous liquid is stored;

a vibrator installed in the aerosol chamber generating an aerosol by transmitting vibration to the viscous liquid inside the aerosol chamber atomizing the viscous liquid;

a spray chamber in which a viscous liquid is stored;

a sprayer installed inside the spray chamber to mix the viscous liquid inside the spray chamber and a compressed gas and spray the viscous liquid in a sprayed state;

a mixing pipe connected to each of the aerosol chamber and the spray chamber to mix and transfer, to an outside, the viscous liquid in the aerosol state inside the aerosol chamber and the viscous liquid in the sprayed state inside the spray chamber, wherein the mixing pipe is connected between the sprayer chamber and the nozzle and is connected between the aerosol chamber and the nozzle; and a nozzle which is connected to the mixing pipe and through which particles of the viscous liquid are sprayed, wherein the particles of the viscous liquid in the aerosol state in the aerosol chamber are smaller than the particles of the viscous liquid in the sprayed state in the spray chamber.

9. The hybrid spray pump of claim 8, wherein the sprayer comprises a spray gas supply pipe to which the compressed gas is supplied, a liquid supply pipe to be submerged in the viscous liquid to transmit the viscous liquid to the spray gas supply pipe, and a spray pipe through which the viscous liquid in the sprayed state formed when the compressed gas supplied through the spray gas supply pipe meets the liquid supply pipe is sprayed into the chamber.

10. The hybrid spray pump of claim 9, further comprising a sheath nozzle installed in the nozzle to wrap around an outer periphery of the nozzle and spray a compressed gas into an outer periphery of the particles of the viscous liquid sprayed from the nozzle.

* * * * *